United States Patent [19]

Larson

[11] Patent Number: 5,458,980
[45] Date of Patent: Oct. 17, 1995

[54] LAMINATES COMPRISING ORGANOSILOXANE ELASTOMERS AND ORGANIC POLYMERS AND METHOD FOR PREPARING SAME

[75] Inventor: Kent R. Larson, Midland, Mich.

[73] Assignee: Dow Corning Corporation, Midland, Mich.

[21] Appl. No.: 321,189

[22] Filed: Oct. 11, 1994

Related U.S. Application Data

[62] Division of Ser. No. 160,134, Dec. 2, 1993, abandoned.

[51] Int. Cl.[6] ............................................. B32B 9/04
[52] U.S. Cl. ............................................. 428/447; 427/387
[58] Field of Search ............................. 428/447; 427/387

[56] References Cited

U.S. PATENT DOCUMENTS 4,719,262  1/1988  Plueddemann ........................ 525/100
4,795,775  1/1989  Baile et al. ........................... 524/379

Primary Examiner—Melvyn I. Marquis
Attorney, Agent, or Firm—Robert Spector

[57] ABSTRACT

Adhesion promoting compositions for bonding a layer of organic polymer to a layer of organosiloxane elastomer during curing of the elastomer by a platinum group metal-catalyzed hydrosilation reaction comprise (a) a copolymer containing repeating units derived from at least one ethylenically unsaturated organic compound and at least one silane containing an ethylenically unsaturated organic group and at least two silicon-bonded hydrolyzable groups per molecule, and (b) an organohydrogensiloxane containing an average of at least three silicon-bonded hydrogen atoms per molecule. If the adhesion promoting composition is to be used with an elastomer prepared by curing an organosiloxane elastomer at temperatures below about 80 degrees C., the adhesion promoting composition includes an alkyl orthosilicate and an organotitanium compound.

14 Claims, No Drawings

LAMINATES COMPRISING ORGANOSILOXANE ELASTOMERS AND ORGANIC POLYMERS AND METHOD FOR PREPARING SAME

This is a divisional of application Ser. No. 08/160,134 filed on Dec. 2, 1993, abandoned.

BACKGROUND OF THE INVENTION

1. Field of the Invention

This invention relates to adhesion promoting organosiloxane compositions. More particularly, this invention relates to organosiloxane primer compositions that cohesively bond organosiloxane elastomers to organic polymers during curing of the elastomers by a hydrosilation reaction. The primer compositions do not contain the objectionable ingredients required in prior art compositions to achieve adhesion when the elastomers are cured at temperatures below about 80° C.

2. Background Information

U.S. Pat. No. 4,719,262, which issued to Edwin Plueddemann on Jan. 12, 1988 describes primer compositions containing organosilicon compounds useful as primers. One group of organosilicon compounds described in this patent comprises bis-silylalkanes of the formula (—O)$_3$SiRSi(O—)$_3$ where R represents an alkylene radical. Each of the silicon atoms is bonded to 1 or two alkoxy radicals and the remaining silicon-boarded groups are substituted or unsubstituted alkenyloxy, alkenyloxyalkoxy, or carbonalkenyloxyalkoxy groups, where the ethylenic unsaturation is located at terminal carbon atoms. This patent also teaches improving the performance of the disclosed organosilicon compounds as bonding agents by combining them with (A) copolymers derived from 1) ethylenically unsaturated organic compounds such as esters of acrylic and methacrylic acids, and 2) ethylenically unsaturated alkoxysilanes, and (B) organohydrogensiloxanes as crosslinking agents for the copolymer.

The copolymers referred to as A in the aforementioned patent are described in U.S. Pat. No. 3,306,800, which issued to Edwin Plueddemann on Feb. 26, 1967.

Primers and adhesion promoters containing the combination of the aforementioned ingredients A, B and the bissilylalkanes described in the Plueddemann U.S. Pat. No. 4,719,262 provide excellent adhesion between organosiloxane elastomers and amorphous organic polymers such as polymerized esters of acrylic or methacrylic acids, polycarbonates and polystyrene. Primer compositions containing these ingredients in combination with a solvent selected from ethylenically unsaturated alcohols containing from 4 to 6 carbon atoms are described in U.S. Pat. No. 4,795, 775, which issued on Jan. 3, 1989.

A disadvantage that may prevent wide acceptance of adhesion promoting compositions described in U.S. Pat. Nos. 4,795,775 and 4,719,262 is the toxicity of some organosilicon compounds containing the bis-silylalkyl group that can be present in these compositions. Organosilicon compounds containing the bis-silylethylene group ≡SiCH$_2$CH$_2$Si≡ are particularly undesireable. This disadvantage has stimulated a search for less toxic organosiloxane adhesion promoters suitable for use with organosiloxane elastomers that cure by a platinum catalyzed hydrosilation reaction.

Primer compositions containing various combinations of organosilicon compounds with alkyl orthosilicates and/or organohydrogensiloxanes are described in the prior art.

Coatings formed from (meth)acrylate polymers containing pendant alkoxysilyl groups are described in U.S. Pat. No. 4,491,650, which issued on Jan. 1, 1985. The polymers are prepared by reacting a poly(meth)acrylate containing pendant hydroxyl groups with an isocyanato-functional alkoxysilane.

Canadian Patent No. 2,069,564, which issued on Dec, 1, 1992 describes primer compositions containing an alkoxysilane that optionally contain a reactive organic group bonded to silicon, an organotitanate and a tin salt of a carboxylic acid.

Primer compositions containing an organotitanate in combination with either an organosilicon compound containing at least 2 silicon-bonded alkoxy groups or an organohydrogensiloxane that optionally contains silicon bonded alkoxy groups are described in U.S. Pat. No. 4,749,741.

Japanese Patent Publication No. 86/004865 describes primer compositions containing an organosilicon resin, an organohydrogensiloxane and an organotitanate.

Japanese Patent Publication No. 91/031266 describes a primer for the copier rolls of an electrostatic copier. The primer contains an organosilicon compound with alkenyl groups, an organohydrogensiloxane, a platinum-containing hydrosilation catalyst and an organotitanate.

One objective of this invention is to define a class of adhesion promoting compositions that will cohesively bond organic polymers to organosiloxane compositions that cure to form elastomers by a hydrosilation reaction while in contact with the organic polymer.

SUMMARY OF THE INVENTION

The objectives of the present invention are achieved using liquid adhesion-promoting composition comprising (a) a copolymer derived from at least one ethylenically unsaturated organic compound and at least one silane containing an ethylenically unsaturated organic group and at least two silicon-bonded hydrolyzable groups per molecule, and (b) an organohydrogensiloxane. If the adhesion promoting composition is to be used with organosiloxane elastomers that will be cured at temperatures below about 80 degrees C while in contact with the substrate, the adhesion promoting composition also includes an alkyl ortho-silicate and an organotitanium compound.

The adhesion promoting compositions are particularly suitable as primer compositions for achieving bonding between organosiloxane elastomers cured by platinum-catalyzed hydrosilation reaction and the amorphous or "glassy" types or organic polymers such as polymethyl methacrylate and polycarbonates used for windows and wind screens, and other structures requiring optical clarity.

DETAILED DESCRIPTION OF THE INVENTION

This invention provides adhesion-promoting compositions for bonding an organic polymer to layer of organosiloxane elastomer during curing of said elastomer by a hydrosilation reaction, where said composition comprises A) from 5 to 50 parts by weight of a copolymer comprising repeating units derived from a) an ethylenically unsaturated organic compound and b) a silane of the formula YR$^1{}_a$SIX$_{3-a}$, where R$^1$ represents a monovalent hydrocarbon radical, X represents a hydrolyzable group, Y represents an ethylenically unsaturated organic group that is bonded to the silicon atom by an alkylene radical, and a is 0 or 1;

B) from 0.5 to 2 parts by weight of an organohydrogensiloxane containing an average of at least three silicon bonded hydrogen atoms per molecule; and C) from 0 to 90 parts by weight of an organic liquid as a solvent for said copolymer and said organohydrogensiloxane, said composition being characterized by the absence of compounds containing the (—O)$_3$SiZSi(O—)$_3$ group where Z represents an alkylene radical.

This invention also relates to a method for bonding organic polymers to organosiloxane elastomers during curing of the elastomers by a hydrosilation reaction. The method comprises the sequential steps of 1) coating the bonding surface of at least one of the organic polymer and the uncured organosiloxane elastomer with an adhesion-promoting composition, 2) allowing any volatile materials from the adhesion promoting composition to evaporate, 3) placing the bonding surfaces of the organic polymer and the curable organosiloxane elastomer in contact with one another and 4) curing the organosiloxane elastomer.

The present adhesion promoting compositions cohesively bond the organosiloxane elastomer to the organic polymer by a hydrosilation reaction at temperatures above about 80° C.

This invention also provides a laminate comprising a layer of an organic polymer and a layer of an elastomeric organosiloxane composition cured by a hydrosilation reaction, where the layers of said laminate are cohesively bonded together curing of said organosiloxane composition by one of the present adhesion-promoting compositions.

When it is desired to cure the organosiloxane elastomer at temperatures below about 80° C. the adhesion promoting composition also includes from 0.5 to 5 weight percent, based on the weight of said composition, of an alkyl orthosilicate and a catalytically effective amount of an organotitanium compound of the type used to promote the hydrolysis and condensation reaction of organosilicon compounds containing hydrolyzable groups. Alkyl orthosilicates can be represented by the general formula Si(OR)$_4$, where R represents an alkyl radical that preferably contains from 1 to 4 carbon atoms or an alkoxyalkyl radical.

The present adhesion promoting compositions are characterized by the absence of compounds containing the bisdisiloxyalkyl group, represented by the formula (—O)$_3$SiZSi(O—)$_3$, where Z represents an alkylene radical and the oxygen atoms are bonded to hydrocarbon or substituted hydrocarbon radicals. Adhesion promoting compositions containing these compounds are described in the aforementioned U. S. Pat. Nos. 4,719,262 and 4,795,775.

The Organic/Organosiloxane Copolymer (Ingredient A)

The organic/organosiloxane copolymer, referred to as ingredient A of the present adhesion-promoting compositions, comprises repeating units derived from 1) at least one silane containing an average of at least two silicon-bonded hydrolyzable groups and at least one ethylenically unsaturated organic group per molecule and 2) at least one ethylenically unsaturated organic compound that is copolymerizable with said silane by a free radical reaction.

Copolymers corresponding to the definition of ingredient A and methods for preparing them are described in U.S. Pat. No. 3,306,800, which issued to Edwin Plueddemann on Feb. 28, 1967 and is incorporated herein in its entirety by reference as a teaching of preparing the copolymers referred to as ingredient A in the present specification.

The ethylenically unsaturated organic compound used to prepare Ingredient A can be any organic compound containing at least one polymerizable carbon-to-carbon double bond per molecule. Suitable classes of ethylenically unsaturated compounds include but are not limited to 1) hydrocarbons such as ethylene, propylene, butadiene and styrene, and 2) esters derived from ethylenically unsaturated carboxylic acids or alcohols. Preferred esters are reaction products of acrylic and methacrylic acid and at least one alcohol that is free of ethylenic unsaturation and contains from 1 to about 5 carbon atoms.

The other class of reactants used to prepare the copolymers referred to as ingredient A are silanes containing both hydrolyzable and ethylenically unsaturated groups. These silanes can be represented by the formula

where R$^1$ represents an unsubstituted or substituted monovalent hydrocarbon radical, X represents a hydrolyzable group, Y represents an ethylenically unsaturated organic group that is bonded to the silicon atom of the silane through an alkylene radical, and a is 0 or 1.

The monovalent hydrocarbon radicals represented by R$^1$ can be alkyl such as methyl or ethyl, cycloalkyl such as cyclohexyl, aryl such as phenyl. If substituents are present, these are preferably halogen atoms. Preferred hydrocarbon radicals are alkyl containing from 1 to 4 carbon atoms, phenyl and 3,3,3-trifluoropropyl, this preference being based on the availability of the chlorosilanes or other intermediates used to prepare ingredient A.

In preferred embodiments of the silane reactant X represents an alkoxy group containing from 1 to about 5 carbon atoms, Y represents a (meth)acryloxyalkyl group and a is 0. Most preferably X is methoxy or ethoxy and Y is 3-methacryloxypropyl. When R$^1$ is present, it is most preferably methyl.

When preparing the copolymer, the molar ratio of the ethylenically unsaturated organic compound to the silane reactant is typically from about 10:1 to 30:1. This ratio is preferably about 20:1, which is equivalent to 95 mole percent of the organic compound, based on total monomers. The reactants used to prepare the copolymer preferably include about one mole percent, based on total reactants, of a mercapto-functional silane such as 3-mercaptopropyltrimethoxysilane as a chain terminating agent to control the molecular weight of the copolymer.

The copolymer referred to as ingredient A is typically prepared by a free radical initiated polymerization of the ethylenically unsaturated reactants. The free radicals can be generated photochemically by decomposition of a photoinitiator in the presence of ultraviolet light or by the thermally induced decomposition of an organic peroxide. Methods for conducting free radical polymerizations are sufficiently well known that a detailed discussion is not required as part of the present specification. Specific procedures fox preparing ingredient A are described in the aforementioned U. S. Pat. No. 3,306,800.

The copolymer constitutes at least 5 weight percent, preferably from 10 to about 50 weight percent, of the present adhesion-promoting compositions.

The Organohydrogensiloxane (Ingredient B)

The second ingredient, referred to as ingredient B, of the present adhesion promoting compositions is an organohydrogensiloxane that contains an average of at least three silicon-bonded hydrogen atoms per molecule.

The silicon-bonded organic groups present in ingredient B are selected from the same group of monovalent hydrocarbon and substituted hydrocarbon radicals referred to in the definition of the R$^1$ of the silane reactant used to prepare ingredient A, with the proviso that the organic groups in ingredient B must be substantially free of ethylenic or acetylenic unsaturation. If more than one hydrocarbon radical is present on any one silicon atom of ingredient B, these can be identical or different. The silicon-bonded hydrocarbon radicals are preferably alkyl containing from 1 to 4 carbon atoms, phenyl or 3,3,3-trifluoropropyl. Most preferably at least one of the hydrocarbon radicals bonded to each silicon atom is methyl.

The molecular structure of ingredient B can be straight chain, branch-containing straight chain, cyclic, or network.

The silicon-bonded hydrogen atoms in ingredient B can be located at the terminal as well as the non-terminal positions of the siloxane molecule. Preferably 100 percent of the non-terminal siloxane units contain a silicon-bonded hydrogen atom. Unless at least about 80 percent of the non-terminal siloxane units of this ingredient contain a silicon-bonded hydrogen atom, it appears that the cohesive bonding characteristic of the present compositions is not achieved using the copolymers referred to as ingredient A and an organohydrogensiloxane as the only reactive ingredients of the adhesion promoting composition.

While the molecular weight of ingredient B is not specifically restricted, viscosities in the range of 3 to 10,000 centipoise (0.003 to 10 Pa.s) at 25 degrees Centigrade are preferred.

The organohydrogensiloxane constitutes from 0.5 to 2 percent, preferably from 0.8 to about 1.2 percent, of the present adhesion-promoting composition.

The Optional Organic Liquid (Ingredient C)

When the present adhesion promoting compositions are used as primers the compositions typically include up to 90 percent by weight or more, based on the weight of the total composition, of an organic liquid that is a solvent for all of the ingredients of the composition, with the exception of any fillers that may be present, and will not react with these ingredients.

The organic liquid preferably constitutes from 49 to 90 weight percent of the composition. Preferred organic solvents have a vapor pressure of at least 100 mm. Hg at 25° C., allowing them to evaporate relatively rapidly under ambient conditions. Suitable organic solvents include but are not limited to hydrocarbons such as pentane, hexane toluene and xylene, mixtures of hydrocarbons such as naphtha and mineral spirits, and alcohols containing from 1 to about 10 carbons. Ethylenically alcohols containing from 1 to about 10 carbons. Ethylenically unsaturated alcohols such as 1-butenol and 2-methyl-3-buten-2-ol are particularly preferred.

The Alkyl Orthosilicate (Ingredient D)

The presence of an alkyl orthosilicate, also referred to as a tetraalkoxysilane, is typically preferred required when the temperature used to cure the organosiloxane elastomer portion of the present laminates is below about 80° C.

The alkyl orthosilicate can be represented by the general formula $(R^2O)_4Si$, where $R^2$ represents an alkyl or alkoxyalkyl radical containing from one up to ten or more carbon atoms. The four $R^2O—$ groups bonded to silicon can be identical or different. In preferred embodiments the four groups are identical and contain from 1 to 4 carbon atoms or are alkoxyalkyl radicals such as 2-methoxyethyl. The alkoxy groups are most preferably methoxy or ethoxy.

The present inventor discovered that when some organosiloxane compositions, particularly those contained reinforcing silica fillers, are cured at temperatures below about 80° C., the identity of the alkoxy group represented by $R^2O—$ can affect the ability of the adhesion-promoting composition to cohesively bond the cured organosiloxane elastomer to the organic polymer. For example, adhesion promoting compositions containing an orthosilicate wherein the alkoxy group is methoxyethyl achieved 100 percent cohesive failure between a organosiloxane elastomer cured at room temperature while in contact with either percent cohesive failure was obtained when the methoxyethyl orthosilicate was replaced with methyl- or n-propyl orthosilicate. When the elastomer was cured by heating for one hour at 150° C., 100 percent cohesive failure was achieved using all three of these orthosilicates.

A cohesive failure value of 100 percent implies that when a force is applied to separate the organosiloxane elastomer layer from the organic polymer layer of the present laminates, failure occurs within the body of the cured elastomer over more than about 90 percent of the exposed interface between the elastomer and the organic polymer.

The alkyl orthosilicate constitutes from 0.5 to about 5 weight percent of the adhesion-promoting composition.

The Organotitanium Compound (Ingredient E)

As discussed for the alkyl orthosilicate ingredient, an organotitanium compound is preferred to achieve cohesive bonding between the organosiloxane elastomer and the organic polymer when the temperature used to cure the organosiloxane composition in the presence of the organic polymer is below about 80° C.

The organotitanium compound can be any of those known to be useful in catalyzing the moisture initiated hydrolysis of siloxanes and silanes containing alkoxy or other hydrolyzable groups. Useful titanium compounds include but are not limited to titanium naphthenate, titanium esters such as tetrabutyl titanate, tetra-2-ethylhexyl titanate, tetraphenyl titanate, and triethanolamine titanate; organosiloxytitanium compounds such as those described in U.S. Pat. No. 3,294,739; and beta-dicarbonyl titanium compounds such as those described in U.S. Pat. No. 3,334,067, both patents being incorporated herein by reference to show suitable organotitanium catalysts and methods for manufacturing these catalysts. Preferred catalysts include tetrabutyl titanate, tetraisopropyl titanate, bis-(acetylacetonyl)-diisopropyltitanium, and 2,5-di-isopropoxy-bisethylacetoacetate titanium.

When it is present, the organotitanium compound constitutes from 0.01 to 0.5 percent by weight, preferably about 0.1 percent, of the present adhesion promoting compositions, which includes the organic solvent.

Preparation and Use of the Present Adhesion Promoting Compositions

The present adhesion promoting compositions are prepared by blending ingredients A, B and the organic solvent to form a solution. Optional ingredients C and/or D are included together with A and B when these optional ingredients are used.

The relative concentrations of the organohydrogen-siloxane (ingredient B) and the alkyl orthosilicate (ingredient D) in the present compositions are typically 100 parts by weight of ingredient A, from 1 to 20 parts by weight of ingredient B and from 1 to 50 parts by weight of ingredient D.

When the present adhesion promoting compositions are used as primers, a solution of the composition is applied as a thin coating to at least one of the mating surfaces to be bonded. After the solvent has evaporated and sufficient time has elapsed to allow at least partial hydrolysis of alkoxy groups present in ingredients A and C in the presence of atmospheric moisture, the mating surfaces of the substrates are placed in contact with one another and the resultant composite is heated under conditions that will promote curing of the organosiloxane elastomer. In preferred composite structures a layer of curable organosiloxane elastomer is placed between two layers of organic polymers.

Curable organosiloxane elastomers that can be bonded to organic polymer substrates using the present adhesion promoting compositions cure by a platinum group metal catalyzed hydrosilation reaction. The ingredients of these curable organosiloxane elastomers typically include a liquid or gum type polyorganosiloxane containing at least two alkenyl radicals per molecule, an organohydrogensiloxane containing at least two silicon-bonded hydrogen atoms per molecule and a platinum group metal or a compound of one of these metals as a hydrosilation catalyst. If it is desired to obtain a crosslinked elastomer following curing of the composition, the sum of the average number of alkenyl radicals present in a molecule of the polyorganosiloxane and the average number of silicon-bonded hydrogen atoms present in a molecule of the organohydrogensiloxane must be greater than 4.

The curable organosiloxane elastomers can include additional ingredients to modify the physical properties or other attributes of cured elastomers prepared from the compositions or to improve the processability of the compositions. Typical ingredients include but are not limited to reinforcing and non-reinforcing fillers, treating agents for the fillers, resinous organosiloxane copolymers, curing catalyst inhibitors and accelerators, dyes, pigments, adhesion promoters, heat stabilizers and flame retarding agents.

Organosiloxane elastomers that are cured by a platinum catalyzed hydrosilation reaction are sufficiently well known that a detailed discussion in this specification is not required. These elastomers are described in greater detail in U.S. Pat. No. 5,110,845, which is incorporated in its entirety by reference.

Curing of the elastomer portion of the present laminated composites can be achieved by heating the composite in a heated press under a pressure that will ensure close contact between the elastomer and the layer(s) of organic polymer along the entire interface(s) between these materials. To preserve integrity of the composite it should be understood that the temperature to which the composite is heated should be below the glass transition temperature of the organic polymer.

The organosiloxane elastomer can also be cured under ambient conditions where the temperature is typically from 20° to about 30° C. As discussed in preceding sections of this specification, in this instance the adhesion-promoting composition preferably includes at least one alkyl orthosilicate and at least one organotitanium compound to facilitate hydrolysis and condensation of the alkoxy groups present in the primer composition.

The present inventor has found that the particular orthosilicate yielding maximum adhesion of the cured organosiloxane elastomer to the organic polymer will vary with the composition of the curable organosiloxane elastomer. Preferred combinations of orthosilicates and culpable organosiloxane elastomers are described in the accompanying examples. Other combinations yielding optimum adhesion can be determined by routine experimentation with a knowledge of the present invention.

In addition to being useful primers, the reactive ingredients of the present adhesion promoting compositions can be included as ingredients of an organosiloxane elastomer that is subsequently cured in contact with at least one layer of an organic polymer using a platinum group metal catalyzed hydrosilation reaction. In this instance the solvent typically required for primer compositions can be omitted. The curable elastomer containing the adhesion promoting additive is then placed in contact with at least one layer of an optically transparent organic polymer and the resultant composite is heated under conditions that will cure the organosiloxane elastomer, or the elastomer is allowed to cure under ambient conditions.

The Organic Polymer Substrate

Organic polymers that can be bonded to one another using the curable organosiloxane elstomers and adhesion promoting compositions of this invention are not restricted. Suitable polymers include but are not limited to: addition type polymers, including polyolefins such as polyethylene and polypropylene, polymers derived from other ethylenically unsaturated organic compounds such as styrene and esters of ethylenically unsaturated acids, such as lower alkyl eaters of acrylic and methacrylic acids; condensation type polymers, including polyesters such and polyethylene terephthalate, polybutylene terephthalate, polyamides and polycarbonates.

The present adhesion promoting compositions are particularly suitable for bonding optically transparent amorphous polymers such as polymethyl methacrylate and polycarbonates using optically transparent sheets of organosiloxane elastomers that cure by a platinum catalyzed hydrosilation reaction. A preferred class of polycarbonates are prepared from phosgene and bisphenols such as Bisphenol A, 2,2-bis(4-hydroxyphenyl)propane.

EXAMPLES

The following examples describe preferred adhesion promoting compositions, curable organosiloxanes and organic polymers that can be used to form the present composites, and should not be interpreted as limiting the invention described in the accompanying claims. Unless otherwise specified all parts and percentages in the examples are by weight and viscosities were measured at 25° C.

Primer compositions were prepared by blending the ingredients, including the methylbutenol solvent, to homogeneity, which typically required about ten seconds of mixing. The ingredients evaluated are represented by the following abbreviations: MMA/MPTMS—a copolymer prepared by reacting methyl methacrylate and 3-methacryloxypropyltrimethoxysilane in a molar ratio of 10:1, respectively, in the presence of 1 percent by weight, based on total monomers, of mercaptopropyltrimethoxysilane and 1 percent by weight of benzoyl peroxide. These reactants were dissolved or suspended in an amount of ethyl acetate equivalent to 79 weight percent of the total mixture.

Ethyl orthosilicate=$(C_2H_5O)_4Si$ n-Propyl orthosilicate=$(C_3H_7O)_4Si$

Methoxyethyl orthosilicate=$(CH_3OC_2H_5O)_4Si$

The organic polymers used as the substrates to which the primer compositions and the curable organosiloxane elastomers were applied were optically transparent sheets of polymethyl methacrylate (PMMA) and a bis-phenol A type of polycarbonate (PC). The sheets measured 5 by 15 cm.

The test samples used to evaluate adhesion were prepared by cleaning the organic polymer substrate using methanol, at which time the primer composition to be evaluated was applied to one surface of the substrate and the solvent was allowed to evaporate for 60 minutes. The curable organosiloxane elastomer was then applied over the primer as a layer of about 0.060 inch (1.5 mm) in thickness. The organosiloxane elastomer was then cured under ambient conditions or by heating, as specified in the examples. The test samples cured at room temperature were allowed to remain under these conditions for 24 hours. The samples cured by heating were heated for one hour at from 12.5+10 degrees C. immediately after being applied to the organic polymer substrate.

The adhesion of the cured elastomer was evaluated by making a series of parallel incisions through this entire thickness of the cured elastomer using a razor blade. The incisions were spaced from 0.125 to 0.25 inch (0.32 to 0.64 cm) apart. A metal spatula was then inserted in the area of the incisions and used to pry the cured elastomer away from the organic polymer substrate. If the cured material tore without separating from surface of the substrate at the interface, this was rated as 100 percent cohesive failure. If cured elastomer could be removed from the substrate intact without tearing and without leaving any of the elastomer adhering to the surface of the substrate, this was rated as 0% cohesive failure.

The curable organosiloxane elastomers evaluated are identified as I and II. These elastomers were prepared by blending the following ingredients to homogeneity.

I 70 parts of a mixture consisting essentially of 82 weight percent of a dimethylvinylsiloxy-terminated polydimethylsiloxane having a viscosity of about 3 Pa.s at 25° C. and 18 weight percent of a resinous benzene-soluble copolymer containing triorganosiloxy units and $SiO_2$ units in the molar ratio of about 0.7 mole of triorganosiloxy unit per mole of $SiO_2$ units, where the triorganosiloxy units are trimethylsiloxy and dimethylvinylsiloxy, and the copolymer contains from 1.4 to 2.2 weight percent of silicon-bonded vinyl radicals.

37 parts of quartz with an average particle size of 5 microns.

0.1 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent.

3 parts of a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent, and 5 parts of chromium oxide II 25 parts of a dimethylvinylsiloxy terminated polydimethylsiloxane having a viscosity of about 2.1 Pa.s at 25 degrees C.

22 parts of silica containing trimethylsiloxy groups.

3.2 parts of titanium dioxide.

28 parts of a mixture containing 65 percent by weight of a dimethylvinylsiloxy-terminated polydimethylsiloxane having a viscosity of about 2.1 at 25° C. and 35 percent by weight of a benzene-soluble resinous copolymer consisting essentially of triorganosiloxy units and $SiO_2$ units in the molar ratio of about 0.7 mole of triorganosiloxy units per mole of $SiO_2$ units, where the triorganosiloxy units are trimethylsiloxy and dimethylvinylsiloxy, and the resinous copolymer contains from 1.4 to 2.2 weight percent of silicon-bonded vinyl radicals.

21 parts of a dimethylvinylsiloxy terminated polydimethylsiloxane having a viscosity of about 9 Pa.s at 25 degrees C.

0.2 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent.

3.5 parts of a trimethylsiloxy-terminated polydiorganosiloxane containing an average of five methylhydrogensiloxane units and three dimethylsiloxane units per molecule with a silicon-bonded hydrogen atom content in the range from about 0.7 to 0. 8 weight percent, and 0.2 part of cyclic methylvinylsiloxanes.

Example 1

This example demonstrates the ability of the present adhesion promoting compositions to achieve 100 percent cohesive failure between a cured organosiloxane elastomer and either polymethyl methacrylate or a polycarbonate when the temperature used to cure the organosiloxane elastomer is above 80° C.

A primer composition of this invention was prepared by blending a 10 percent by weight solution of the MMA/MPTMS copolymer (ingredient A1) in 2-methyl-3-buten-2-ol, referred to hereinafter as methylbutenol, with 1 percent, based on the weight of the solution, of a trimethylsiloxy terminated methylhydrogensiloxane containing 1.6 weight percent of silicon-bonded hydrogen (ingredient B1).

Test samples were prepared by coating curable organosiloxane elastomers identified as I and II over the dried primer layer and curing the organosiloxane elastomers by heating them for one hour at 125°±100° C. The cured elastomers exhibited 100 percent cohesive failure.

For comparative purposes, test samples were prepared by curing organosiloxane elastomer II in contact with four primer compositions outside the scope of the present invention. Sheets of polymethyl methacrylate were used as the substrate.

1) A 15 weight percent solution in methylbutenol of ingredient A1.
2) A 1 weight percent solution in methylbutenol of ingredient B1.
3) A 1 weight percent solution in methylbutenol of a trimethylsiloxy-terminated polydiorganosiloxane and containing an average of five methylhydrogensiloxane units and three dimethylsiloxane units per molecule with a silicon-bonded hydrogen atom content in the range from about 0.7 to 0.8 weight percent.
4) A 1 weight percent solution in methylbutenol of a dimethylhydrogensiloxy-terminated polydimethylsiloxane containing an average of 20 repeating units per molecule.

All of the comparative primer compositions (1–4) exhibited 0 percent cohesive failure of the elastomer following curing of the elastomer compositions for one hour at 125°±10° C.

Example 2

This example demonstrates the ability of primer compositions containing the optional alkyl orthosilicate and organic titanate to cohesively bond organic polymers to elastomers prepared by curing organosiloxane elastomers I and II at room temperature, and the selectivity required in the choice of alkyl group present on the orthosilicate using organosiloxane elastomers containing a treated reinforcing silica filler.

Primer composition (5) contained 10 percent of the copolymer, 1.4 percent n-propyl orthosilicate, 1 percent of the organohydrogensiloxane referred to as ingredient B1 in example 1 and 0.12 percent of tetrabutyl titanate. Primer composition (6) contained the same ingredients as 1, with the exception that the n-propyl orthosilicate was replaced with an equal weight of methoxyethyl orthosilicate.

Test samples were prepared as described in Example 1 using primers 5 and 6 individually, curable organosiloxane elastomer I, which contained quartz as the filler, and both polycarbonate and polymethyl methacrylate sheets as the substrate. The organosiloxane elastomers were cured by allowing them to remain for 24 hours under ambient conditions. At this time all of the samples exhibited 100 cohesive failure.

For comparative purposes a set of samples were prepared and cured as described in the preceding paragraph of this example, with the exception that organosiloxane elastomer II, which contained a reinforcing silica filler, was used in place of organosiloxane elastomer I. Following curing for 24 hours under ambient conditions all of the samples prepared using primer 5 exhibited 0 percent cohesive failure and the samples prepared using primer composition 6 exhibited 100 percent cohesive failure.

When the samples described in this example containing primer 5 and organosiloxane elastomer II were cured by heating them for 30 minutes at 100° C. they exhibited 100 percent cohesive failure.

These results demonstrate that the criticality of the type of alkoxy group bonded to the silicon atom of the orthosilicate when the organosiloxane elastomer is cured at room temperature is not observed when the elastomer is cured at higher temperatures.

A second set of comparative samples were prepared by curing organosiloxane elastomer I under ambient conditions while in contact with polycarbonate and polymethyl methacrylate substrates. All of the primer compositions evaluated lacked one optional or required ingredient of the primer compositions of this invention.

The following primer compositions were evaluated:
1) 10 percent of ingredient A1, 1.4 percent of n-propyl orthosilicate and 0.12 percent tetrabutyl titanate in methylbutenol,
2) 10 percent of ingredient A, 1 percent of ingredient B1 and 1.4 percent of n-propyl orthosilicate.

All of the test samples prepared using primer compositions 1 and 2 exhibited 0 percent cohesive failure following curing for 24 hours under ambient conditions.

That which is claimed is:

1. A laminate comprising a layer of an organic polymer and a layer of an organosiloxane elastomer cured by a platinum catalyzed hydrosilation reaction, where the layers of said laminate are cohesively bonded together by an adhesion-promoting composition located at the interface of said layers and comprising A) from 5 to 50 parts by weight of a copolymer comprising units derived from a) an ethylenically unsaturated organic compound, and b) a silane of the formula $YR^1_aSiX_{3-a}$, where $R^1$ represents a monovalent hydrocarbon radical, X represents a hydrolyzable group, Y represents an ethylenically unsaturated organic group that is bonded to the silicon atom of said silane through an alkylene radical, and a is 0 or 1;

B) from 0.5 to 2 parts by weight of an organohydrogensiloxane containing an average of at least three silicon bonded hydrogen atoms per molecule; and C) from 0 to 90 parts by weight of an organic solvent where said composition is characterized by the absence of compounds containing the $(-O)_3SiZSi(O-)_3$ group, where Z represents an alkylene radical.

2. A laminate according to claim 1 where the molar ratio of units in said copolymer derived from the ethylenically unsaturated organic compound to units derived from the silane is from 10:1 to 30:1, said organohydrogensiloxane constitutes from 0.8 to 1.2 weight percent of said composition, and said ethylenically unsaturated organic compound is an alkyl ester of an ethylenically unsaturated carboxylic acid.

3. A laminate according to claim 2 where said composition further comprises at least one member selected from the group consisting of organic titanium compounds and alkyl orthosilicates corresponding to the formula $(R^2O)_4Si$, where $R^2$ represents an alkyl or alkoxyalkyl radical containing from one to ten carbon atoms.

4. A laminate according to claim 3 where said titanium compound is selected from the group consisting of tetraalkyl titanates and chelated titanium compounds.

5. A laminate according to claim 3 where said organic polymer is a polycarbonate or a polyalkyl methacrylate, said ethylenically unsaturated organic compound is an alkyl methacrylate, $R^1$ is methyl, $R^2$ is methyl or alkoxymethyl, X is an alkoxy group and Y is $CH_2=C(R^3)C(O)O(CH_2)_3-$ where $R^3$ is hydrogen or methyl, said organosiloxane is a triorganosiloxy-terminated alkylhydrogensiloxane and said solvent is selected from the group consisting of liquid hydrocarbons and alcohols.

6. A laminate according to claim 5 where said polyalkyl methacrylate is polymethymethacrylate, said polycarbonate is derived from a bis-phenol, said ethylenically unsaturated organic compound is methyl methacrylate, the alkyl radicals present in said organohydrogensiloxane are methyl, and said solvent is an alcohol containing from 1 to 10 carbon atoms.

7. A laminate according to claim 6 where said solvent is an ethylenically unsaturated alcohol.

8. A method for bonding organic polymers to organosiloxane elastomers during curing of the elastomers by a hydrosilation reaction, where said method comprises the sequential steps of 1) coating the bonding surface of at least one of the organic polymer and the uncured organosiloxane elastomer with an adhesion-promoting composition, 2) allowing volatile liquids present in said composition to evaporate, 3) placing the bonding surfaces of the organic polymer and the uncured organosiloxane elastomer in contact with one another and 4) curing the organosiloxane elastomer, where said composition comprises A) from 5 to 50 parts by weight of a copolymer comprising units derived from a) an ethylenically unsaturated organic compound, and b) a silane of the formula $YR^1_aSiX_{3-a}$, where $R^1$ represents a monovalent hydrocarbon radical, X represents a hydrolyzable group, Y represents an ethylenically unsaturated organic group that is bonded to silicon through an alkylene radical, and a is 0 or 1;

B) from 0.5 to 2 parts by weight of an organohydrogensiloxane containing an average of at least three silicon bonded hydrogen atoms per molecule; and C) from 0 to 90 parts by weight of an organic liquid as a solvent for said copolymer and said organohydrogensiloxane where said composition is characterized by the absence of compounds containing the $(-O)_3SiZSi(O-)_3$ group, where Z represents an alkylene radical.

9. A method according to claim 8 where the molar ratio of units in said copolymer derived from the ethylenically unsaturated organic compound to units derived from said silane is from 10:1 to 30:1, said organohydrogensiloxane constitutes from 0.8 to 1.2 weight percent of said composition, and said ethylenically unsaturated organic compound is an alkyl ester of an ethylenically unsaturated carboxylic acid.

10. A method according to claim 9 where said composition further comprises at least one member selected from the group consisting of organic titanium compounds and alkyl orthosilicates corresponding to the formula $(R^2O)_4Si$, where $R^2$ represents an alkyl or alkoxyalkyl radical containing from one to ten carbon atoms.

11. A method according to claim 10 where said titanium compound is selected from the group consisting of tetraalkyl titanates and chelated titanium compounds.

12. A method according to claim 10 where said organic polymer is a polycarbonate or a polyalkyl methacrylate, said ethylenically unsaturated organic compound is an alkyl ester of methacrylic acid, $R^1$ is methyl, $R^2$ is methyl or alkoxymethyl, X is an alkoxy group and Y is $CH_2=C(R^3)C(O)O(CH_2)_3$—where $R^3$ is hydrogen or methyl, said organohydrogensiloxane is a triorganosiloxy-terminated alkylhydrogensiloxane and said solvent is selected from the group consisting of liquid hydrocarbons and alcohols.

13. A method according to claim 12 where said polyalkyl methacrylate is polymethylmethacrylate, said polycarbonate is derived from a bis-phenol, said ethylenically unsaturated organic compound is methyl methacrylate, the alkyl radicals present in said organohydrogensiloxane are methyl, and said solvent is an alcohol containing from 1 to 10 carbon atoms.

14. A method according to claim 13 where said solvent is an ethylenically unsaturated alcohol.

\* \* \* \* \*